(12) United States Patent
Matsumura

(10) Patent No.: US 11,688,185 B2
(45) Date of Patent: Jun. 27, 2023

(54) CONSCIOUSNESS STATE DETERMINATION SYSTEM AND AUTONOMOUS DRIVING APPARATUS

(71) Applicant: TOYOTA JIDOSHA KABUSHIKI KAISHA, Toyota (JP)

(72) Inventor: Takeshi Matsumura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/683,414

(22) Filed: Mar. 1, 2022

(65) Prior Publication Data

US 2022/0301323 A1 Sep. 22, 2022

(30) Foreign Application Priority Data

Mar. 22, 2021 (JP) .................................. 2021-046754

(51) Int. Cl.
*G06V 20/59* (2022.01)
*B60W 40/08* (2012.01)
(Continued)

(52) U.S. Cl.
CPC ........... *G06V 20/597* (2022.01); *B60W 40/08* (2013.01); *B60W 40/105* (2013.01); *B60W 50/14* (2013.01); *G06V 40/161* (2022.01); *G06V 40/18* (2022.01); *H04W 4/027* (2013.01); *H04W 4/12* (2013.01); *B60W 2040/0827* (2013.01); *B60W 2050/143* (2013.01); *B60W 2050/146* (2013.01);
(Continued)

(58) Field of Classification Search
CPC .... G06V 20/597; G06V 40/161; G06V 40/18; B60W 40/08; B60W 40/105; B60W 50/14; B60W 2040/0827; B60W 2050/143; B60W 2050/146; B60W 2420/42; B60W 2540/225; B60W 2540/229; H04W 4/02; H04W 4/12
See application file for complete search history.

(56) References Cited

U.S. PATENT DOCUMENTS 10,268,858 B2 * 4/2019 Todeschini ........... G06K 7/1439
10,474,916 B2 * 11/2019 Krishnan ............... G06V 20/59
(Continued)

FOREIGN PATENT DOCUMENTS

JP 2006-119965 A 5/2006
JP 2006-315491 A 11/2006
(Continued)

*Primary Examiner* — Mohamed Barakat
(74) *Attorney, Agent, or Firm* — Dinsmore & Shohl LLP

(57) ABSTRACT

A consciousness state determination system comprises a first image-taking section which is mounted on a vehicle and takes images of a driver of the vehicle, an electronic control unit which executes a consciousness state determination process of determining whether the driver is conscious, based on a first image corresponding to the image of the driver taken by the first image-taking section, and a mobile terminal carried by the driver. The electronic control unit is configured to determine whether the driver is conscious, based on terminal-side information corresponding to information acquired by the mobile terminal when a predetermined condition that a reliability level of a determination result obtained from the consciousness state determination process is presumably low, becomes satisfied.

8 Claims, 9 Drawing Sheets

(51) Int. Cl.
*G06V 40/16* (2022.01)
*G06V 40/18* (2022.01)
*B60W 40/105* (2012.01)
*B60W 50/14* (2020.01)
*H04W 4/12* (2009.01)
*H04W 4/02* (2018.01)

(52) U.S. Cl.
CPC ... *B60W 2420/42* (2013.01); *B60W 2540/225* (2020.02); *B60W 2540/229* (2020.02)

(56) References Cited

U.S. PATENT DOCUMENTS

| | | | |
|---|---|---|---|
| 2005/0270145 | A1 | 12/2005 | Kataoka et al. |
| 2006/0025918 | A1 | 2/2006 | Saeki |
| 2006/0103513 | A1 | 5/2006 | Ihara et al. |
| 2015/0194035 | A1* | 7/2015 | Akiva ............... H04N 7/183 340/575 |
| 2017/0313319 | A1* | 11/2017 | Kishi ............... B60W 10/18 |
| 2018/0033280 | A1* | 2/2018 | Taylor ............... G06V 40/166 |
| 2018/0345980 | A1* | 12/2018 | Morita ............... B60W 40/08 |
| 2020/0231182 | A1* | 7/2020 | Oba ............... B60W 40/09 |

FOREIGN PATENT DOCUMENTS

| | | | |
|---|---|---|---|
| JP | 2008-195402 A | 8/2008 |
| JP | 4172434 B2 | 10/2008 |
| JP | 2009-190464 A | 8/2009 |
| JP | 4349210 B2 | 10/2009 |
| JP | 2010-6279 A | 1/2010 |
| JP | 2014-115983 A | 6/2014 |
| JP | 2014-148293 A | 8/2014 |
| JP | 2021-018665 A | 2/2021 |

* cited by examiner

CONSCIOUSNESS STATE DETERMINATION SYSTEM AND AUTONOMOUS DRIVING APPARATUS

CROSS-REFERENCE TO RELATED APPLICATIONS

This application claims priority to Japanese patent application No. JP 2021-046754 filed on Mar. 22, 2021, the content of which is hereby incorporated by reference in its entirety.

BACKGROUND

Field

The present disclosure relates to a consciousness state determination system which determines a consciousness state of a driver and an autonomous driving apparatus.

Description of the Related Art

There is proposed an apparatus which takes images of a face of a driver of a vehicle by using a camera or a driver monitor camera and determines whether the driver is conscious, based on image data of the images taken by the camera (for example, see JP 2014-115983 A). The proposed apparatus is configured to determine whether eyes of the driver are closed, based on the image data and thereby determines whether the driver is conscious.

Further, there is proposed an autonomous driving apparatus configured to execute an autonomous driving control. The autonomous driving control is a control of autonomously changing a moving speed of the vehicle and a steering angle of steered-wheels of the vehicle without driving maneuverings carried out by the driver. Levels of the autonomous driving control or autonomous driving levels are defined by a level 0 to a level 5 by the SAE (Society of Automotive Engineers). Recently, the autonomous driving control of the level 3 is put to practical use. The level 3 is a level that the autonomous driving apparatus carries out all of the driving maneuverings in a particular environment, and the driver is required to carry out the driving maneuverings when a switching request of the driving maneuverings or a driving maneuvering switching request occurs. Thus, the autonomous driving control of the level 3 is also referred to as "conditional autonomous driving control".

At the level 3, when the autonomous driving apparatus cannot continue executing the autonomous driving control, i.e., when the driving maneuvering switching request occurs, the driver needs to turn over the driving maneuverings. Thus, the driver must not be asleep. On the other hand, the driver may be inattentive. Thus, while the autonomous driving apparatus executes the autonomous driving control of the level 3, the driver may take various actions such as operating a mobile terminal and reading a book.

For example, when the driver operates the mobile terminal such as a smartphone while the autonomous driving control is executed, the driver looks down and operates the mobile terminal. In such a situation, when the camera takes an image of the driver, the eyes of the driver in the image seems to be closed. In this case, the proposed apparatus determines that the eyes of the driver are closed. Thereby, the proposed apparatus may mistakenly determine that the driver is unconscious, i.e., the driver is asleep although the driver is conscious.

SUMMARY

An object of the present disclosure is to provide a consciousness state determination system which can accurately determine whether the driver is conscious even when the driver does not face the front and an autonomous driving apparatus.

According to the present disclosure, a consciousness state determination system comprises a first image-taking section, an electronic control unit, and a mobile terminal. The first image-taking section is mounted on a vehicle and takes images of a driver of the vehicle. The electronic control unit executes a consciousness state determination process of determining whether the driver is conscious, based on a first image corresponding to the image of the driver taken by the first image-taking section. The mobile terminal is carried by the driver. Further, the electronic control unit is configured to determine whether the driver is conscious, based on terminal-side information corresponding to information acquired by the mobile terminal when a predetermined condition that a reliability level of a determination result obtained from the consciousness state determination process is presumably low, becomes satisfied.

With the consciousness state determination system according to the present disclosure, for example, even when the driver looks down and operates the mobile terminal, the electronic control unit can accurately determine whether the driver is conscious, based on the terminal-side information.

According to a teaching of the present disclosure, the mobile terminal may include a second image-taking section which takes images of the driver. In this teaching, the terminal-side information may include a second image corresponding to the image of the driver taken by the second image-taking section. Further, in this teaching, the electronic control unit may be configured to determine whether the driver is conscious by executing the consciousness state determination process to the second image when the predetermined condition is satisfied.

With the consciousness state determination system according to this teaching, the second image taken when the driver looks down and operates the mobile terminal, is an image of a face of the driver generally from the front. Thus, the electronic control unit can accurately determine whether the driver is conscious by executing the consciousness state determination process to the second image.

According to another teaching of the present disclosure, the mobile terminal may be configured to notify the driver of whether a face of the driver is included in the second image.

With the consciousness state determination system according to this teaching, for example, when the driver looks down and reads a book, the driver is triggered to position the mobile terminal at a suitable position so as to include the face of the driver in the second image. Thus, the electronic control unit can accurately determine whether the driver is conscious by executing the consciousness state determination process to the second image.

According to further another teaching of the present disclosure, the mobile terminal may be configured to detect operation information corresponding to information on operations to the mobile terminal carried by the driver. In this teaching, the terminal-side information may include the operation information. Further, in this teaching, the electronic control unit may be configured to determine whether the driver is conscious, based on the operation information when the predetermined condition is satisfied.

With the consciousness state determination system according to this teaching, for example, even when the driver looks down and operates the mobile terminal, the electronic control unit can accurately determine whether the driver is conscious, based on the operation information.

According to further another teaching of the present disclosure, the electronic control unit may be configured to determine whether the driver is conscious, based on a time period of not detecting any operations to the mobile terminal carried out by the driver.

When the time period of not detecting any operations to the mobile terminal carried out by the driver becomes equal to or longer than a predetermined time period, the driver is probably unconscious, i.e., the driver is probably asleep. Thus, with the consciousness state determination system according to this teaching, the electronic control unit can accurately determine whether the driver is conscious by using the information on the operations to the mobile terminal carried out by the driver.

According to further another teaching of the present disclosure, the mobile terminal may be configured to at least detect information on a first operation and information on a second operation which is more complex than the first operation as the operation information. In this teaching, the electronic control unit may be configured to determine that the driver is unconscious when the time period of not detecting any operations to the mobile terminal carried out by the driver becomes longer than a first time period threshold after the electronic control unit detects the first operation. Furthermore, the electronic control unit may be configured to determine that the driver is unconscious when the time period of not detecting any operations to the mobile terminal carried out by the driver becomes longer than a second time period threshold after the electronic control unit detects the second operation. Further, in this teaching, the second time period threshold may be greater than the first time period threshold.

The complex operation to the mobile terminal carried out by the driver shows that the driver is conscious. With the consciousness state determination system according to this teaching, when the electronic control unit detects the complex operation to the mobile terminal carried out by the driver, the electronic control unit elongates a waiting time period for determining that the driver is unconscious. That is, the second time period threshold is set a value greater than the first time period threshold. Thus, the electronic control unit can accurately determine whether the driver is conscious.

According to further another teaching of the present disclosure, the consciousness state determination system may comprise a first acceleration sensor which is mounted on the vehicle and acquires information on an acceleration of the vehicle as a first acceleration information. In this teaching, the mobile terminal may include a second acceleration sensor which acquires information on an acceleration of the mobile terminal as a second acceleration sensor. Further, in this teaching, the terminal-side information may include the second acceleration information.

Furthermore, in this teaching, the electronic control unit may be configured to determine whether the driver is conscious, based on the first acceleration information and the second acceleration information when the predetermined condition becomes satisfied.

With the consciousness state determination system according to this teaching, the electronic control unit according to this teaching can distinguish between a movement of the vehicle and a movement of the terminal, based on the first acceleration information and the second acceleration information. Thereby, the electronic control unit can determine whether the driver moves the mobile terminal. Thus, the electronic control unit can accurately determine whether the driver is conscious, based on the movement of the mobile terminal.

According to another present disclosure, an autonomous driving apparatus is mounted on a vehicle and executes an autonomous driving control of autonomously carrying out driving maneuverings of the vehicle. The autonomous driving apparatus comprises an image-taking section, and an electronic control unit. The image-taking section takes images of a driver of the vehicle. The electronic control unit executes a consciousness state determination process of determining whether the driver is conscious, based on a driver image corresponding to the image of the driver taken by the image-taking section while the electronic control unit executes the autonomous driving control. Further, the electronic control unit is configured to determine whether the driver is conscious, based on terminal-side information corresponding to information acquired from a mobile terminal when a predetermined condition that a reliability level of a determination result obtained from the consciousness state determination process is presumably low, becomes satisfied.

According to one or more embodiments, the electronic control unit may be realized by at least one micro-processor programmed to realize one or more functions described in the description of this application. Further, according to one or more embodiments, the electronic control unit may be entirely or partially realized by hardware configured by integrated circuit such as ASIC dedicated to one or more applications. Elements of the present disclosure are not limited to elements of embodiments and modified examples of the present disclosure described with reference to the drawings. The other objects, features and accompanied advantages of the present disclosure can be easily understood from the embodiments and the modified examples of the present disclosure.

DESCRIPTION OF THE EMBODIMENTS

First Embodiment

Figure 1:
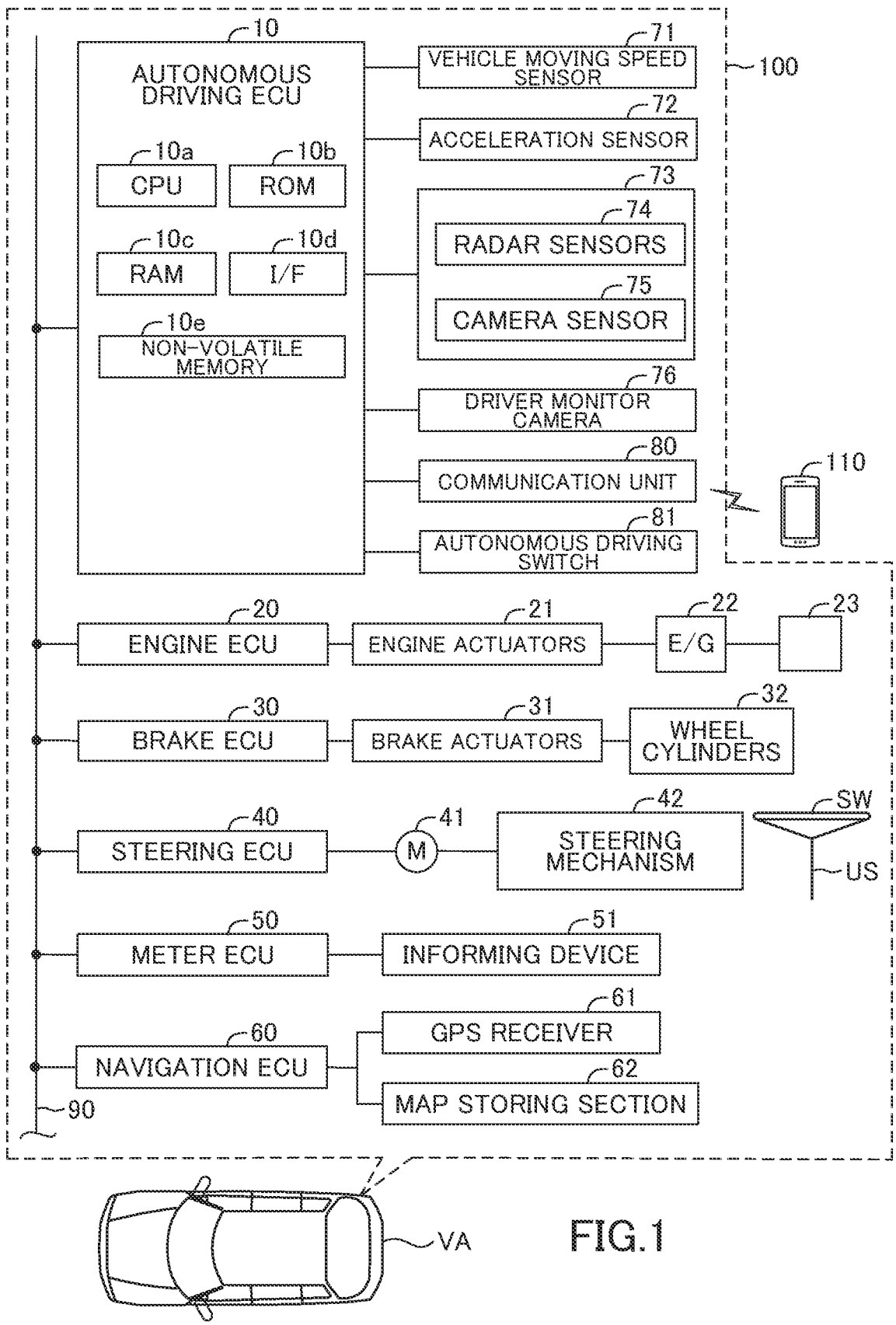
FIG. 1 is a general configuration view which shows a consciousness state determination system according to a first embodiment of the present disclosure.

As shown in FIG. 1, a consciousness state determination system includes an autonomous driving apparatus 100 mounted on or applied to a vehicle VA and a mobile terminal 110.

<Configurations of Autonomous Driving Apparatus>

The autonomous driving apparatus 100 includes an autonomous driving ECU 10, an engine ECU 20, a brake ECU 30, a steering ECU 40, a meter ECU 50, and a navigation ECU 60. The ECUs 10, 20, 30, 40, 50, and 60 are electrically connected to send and receive data to and from each other via a CAN (Controller Area Network) 90.

ECU stands for electronic control unit. The ECU is an electronic control unit which includes a micro-computer as a main component. The micro-computer includes a CPU, a ROM, a RAM, an interface, and a non-volatile memory. The CPU is configured or programmed to realize various functions by executing instructions, or programs, or routines memorized in the ROM. For example, the autonomous driving ECU 10 includes a micro-computer which includes a CPU 10a, a ROM 10b, a RAM 10c, an interface (I/F) 10d, and a non-volatile memory 10e.

The engine ECU 20 is electrically connected to engine actuators 21. The engine actuators 21 include a throttle valve actuator which changes an opening degree of a throttle valve of an internal combustion engine 22. The engine ECU 20 can change torque which the internal combustion engine 22 generates by driving the engine actuators 21. The torque generated by the internal combustion engine 22 is transmitted to driven-wheels of the vehicle VA via a transmission 23 and a driving force transmission mechanism. Thus, the engine ECU 20 is configured to control driving force applied to the vehicle VA by controlling the engine actuators 21.

It should be noted that when the vehicle VA is a hybrid vehicle, the engine ECU 20 is configured to control the driving force generated by one or both of the internal combustion engine and at least one electric motor as vehicle driving sources. When the vehicle VA is an electric vehicle, the engine ECU 20 is configured to control the driving force generated by at least one electric motor as the vehicle driving source.

The brake ECU 30 is electrically connected to brake actuators 31. The brake actuators 31 include known hydraulic circuits. The hydraulic circuits include a reservoir, at least one oil pump, and various valve devices. The brake actuators 31 adjust hydraulic pressure or braking pressure applied to wheel cylinders 32 in response to a command from the brake ECU 30. Friction braking force applied to wheels of the vehicle VA changes, depending on the braking pressure. Thus, the brake ECU 30 is configured to control the braking force of the vehicle VA by controlling the brake actuators 31.

The steering ECU 40 is electrically connected to an assist motor (M) 41. The assist motor 41 is installed in a steering mechanism 42. The steering mechanism 42 is a mechanism which steers steered-wheels of the vehicle VA in response to a rotating maneuvering applied to a steering wheel SW. The steering mechanism 42 includes the steering wheel SW, a steering shaft US operatively connected to the steering wheel SW, and a steering gear mechanism (not shown). The steering ECU 40 detects a steering torque input by a driver of the vehicle VA to the steering wheel SW by a steering torque sensor (not shown) provided on the steering shaft US. The steering ECU 40 drives the assist motor 41, based on the detected steering torque. The steering ECU 40 applies the steering torque or a steering assist torque to the steering mechanism 42 by driving the assist motor 41 to assist the steering maneuverings carried out by the driver.

In addition, the steering ECU 40 drives the assist motor 41 in accordance with a steering command including an autonomous steering torque described later from the autonomous driving ECU 10 while an autonomous driving control described below is executed. Unlike the steering assist torque, the autonomous steering torque is a torque which is applied to the steering mechanism 42 in response to the steering command from the autonomous driving ECU 10 without the steering maneuverings carried out by the driver. The autonomous steering torque changes the steering angle of the steered-wheels of the vehicle VA.

The meter ECU 50 is electrically connected to an informing device 51. The informing device 51 includes a buzzer and a displaying device. The displaying device is, for example, a multi-information display which is provided in front of a driver's seat of the vehicle VA. The meter ECU 50 alerts the driver by activating the buzzer and displays an alert mark or a warning lamp on the displaying device in response to a command from the autonomous driving ECU 10.

The navigation ECU 60 is electrically connected to a GPS receiver 61 and a map storing section 62. The GPS receiver 61 receives a GPS signal used to detect a longitude and a latitude of a position of the vehicle VA. The map storing section 62 stores map information. The map information includes road information. The road information includes types of roads, widths of the roads, and curvature radii of the roads. It should be noted that in this embodiment, the type of the road is any of a limited highway (or an express highway) and a general road. The navigation ECU 60 executes various calculation processes, based on the longitude and the latitude of the position of the vehicle VA and the map information and displays the position of the vehicle VA on a map on a touch panel (not shown).

A vehicle moving speed sensor 71 detects a moving speed of the vehicle VA or a vehicle moving speed and outputs a signal representing the vehicle moving speed SPD to the autonomous driving ECU 10.

An acceleration sensor 72 acquires information on an acceleration of the vehicle VA which hereinafter will be referred to as "first acceleration information" and outputs a signal representing the first acceleration information to the autonomous driving ECU 10. The first acceleration information includes an acceleration value ax1, an acceleration value ay1, and an acceleration value az1. The acceleration value ax1 is a value of the acceleration of the vehicle VA in a longitudinal direction of the vehicle VA or a value of the longitudinal acceleration of the vehicle VA. The acceleration value ay1 is a value of the acceleration of the vehicle VA in a lateral direction of the vehicle VA or a value of the lateral acceleration of the vehicle VA. The acceleration value az1 is a value of the acceleration of the vehicle VA in a vertical direction of the vehicle VA or a value of the vertical acceleration of the vehicle VA.

Surrounding sensors 73 acquire information on a road around the vehicle VA including a moving lane in which the vehicle VA moves and information on standing objects on the road. The standing objects include, for example, moving objects such as a pedestrian, a four-wheeled vehicle, and a two-wheeled vehicle and non-moving objects such as a guard rail and a fence. Hereinafter, the standing object will be simply referred to as "object". The surrounding sensors 73 include radar sensors 74 and a camera sensor 75.

For example, the radar sensor 74 transmits millimeter waves to a surrounding area and receives the millimeter waves or a reflected wave reflected by the object in a transmitting area. The surrounding area includes at least a forward area in front of the vehicle VA. The millimeter wave is an electric wave of a millimeter wave band. Then, the radar sensor 74 determines whether there is the object and calculates information on a relationship between the vehicle VA and the object. The information on the relationship between the vehicle VA and the object includes a distance between the vehicle VA and the object, an orientation or a position of the object with regard to the vehicle VA, and a relative speed of the object with respect to the vehicle VA. Hereinafter, the information on the relationship between the vehicle VA and the object will be referred to as "object information".

The camera sensor 75 takes images of a view ahead of the vehicle VA and acquires image data. A moving lane is defined by a left lane marking and a right lane marking (for example, a left white line and a right white line). The camera sensor 75 recognizes the left lane marking and the right lane marking, based on the image data and calculates at least one parameter such as a curvature representing a shape of the moving lane and at least one parameter representing a relationship in position between the vehicle VA and the moving lane. The parameter representing the relationship in position between the vehicle VA and the moving lane may be a distance from the left or right lane marking to a center position of the vehicle VA in a width direction of the vehicle VA. Information acquired by the camera sensor 75 will be referred to as "traffic lane information". It should be noted that the camera sensor 75 may be configured to determine whether there is the object and calculate the object information, based on the image data.

The surrounding sensors 73 output vehicle surrounding information on a surrounding situation around the vehicle VA including the object information and the traffic lane information to the autonomous driving ECU 10.

A driver monitor camera 76 or a first image-taking section is provided on an upper side of a column cover or a so-called steering column cover of the steering wheel SW. The driver monitor camera 76 takes images of the driver and acquires image data. Hereinafter, the image data acquired by the driver monitor camera 76 will be referred to as "first image". A position and an orientation of the driver monitor camera 76 are set such that left and right eyes of the driver are included in the first image. In this embodiment, the position and the orientation of the driver monitor camera 76 are set so as to take an image of an entire face of the driver. Thus, the first image includes the left and right eyes and a mouth of the driver. The driver monitor camera 76 outputs the first image to the autonomous driving ECU 10.

It should be noted that the driver monitor camera 76 may be set at any position as far as the driver monitor camera 76 takes the image of the face of the driver in the vehicle VA. For example, the driver monitor camera 76 may be provided near a dashboard or a windshield of the vehicle VA.

Further, the autonomous driving ECU 10 is electrically connected to a communication unit 80. The communication unit 80 includes an antenna section and a communication processing section (not shown). The communication unit 80 is configured to send and receive information to and from a mobile terminal 110 by wireless.

The communication unit 80 may be configured to communicate with devices other than the mobile terminal 110.

The communication unit 80 may be configured to communicate with a VICS (Vehicle Information and Communication System, a registered trademark) and receive road traffic information from the VICS (a registered trademark). The road traffic information includes information on a traffic congestion area and information on a traffic-closed area.

An autonomous driving switch 81 is a switch provided to be operated by the driver. The driver can set an operating condition of the autonomous driving control described below by operating the autonomous driving switch 81.

<Summary of Autonomous Driving Control>

Hereinafter, the autonomous driving ECU 10 will be simply referred to as "ECU 10". The ECU 10 is configured to execute the autonomous driving control. In this embodiment, a level of the autonomous driving level is a level 3. The autonomous driving control includes a speed control and a steering control.

An example of the speed control is an adaptive cruise control. Hereinafter, the adaptive cruise control will be referred to as "ACC". The ACC is known (for example, see JP 2014-148293 A, JP 2006-315491 A, and JP 417243 B).

The ACC includes two kinds of controls, i.e., a constant speed moving control and a preceding vehicle following control. The constant speed moving control is a control of adjusting the moving speed of the vehicle VA to control the moving speed of the vehicle VA to a target speed Vset when neither the accelerator pedal nor the brake pedal are operated. The preceding vehicle following control is a control of moving the vehicle VA to follow a preceding vehicle or a following target vehicle, maintaining a distance between the following target vehicle and the vehicle VA at a target inter-vehicle distance Dset when neither the accelerator pedal nor the brake pedal are operated. The following target vehicle is a vehicle which moves in the forward area ahead of the vehicle VA and moves directly in front of the vehicle VA.

The ECU 10 determines whether there is the following target vehicle, based on the vehicle surrounding information. When the ECU 10 determines that there is no following target vehicle, the ECU 10 executes the constant speed moving control. While the ECU 10 executes the constant speed moving control, the ECU 10 controls a driving force by causing the engine ECU 20 to control the engine actuators to control the vehicle moving speed SPD to a target speed Vset and if needed, controls a braking force by causing the brake ECU 30 to control the brake actuators 31.

On the other hand, when the ECU 10 determines that there is the following target vehicle, the ECU 10 executes the preceding vehicle following control. While the ECU 10 executes the preceding vehicle following control, the ECU 10 calculates the target inter-vehicle distance Dset by multiplying a target inter-vehicle time tw by the vehicle moving speed SPD. The target inter-vehicle time tw is set by an inter-vehicle time switch (not shown). Then, the ECU 10 controls the driving force by causing the engine ECU 20 to control the engine actuators 21 to control the inter-vehicle distance between the vehicle VA and the following target vehicle to the target inter-vehicle distance Dset and if needed, controls the braking force by causing the brake ECU 30 to control the brake actuators 31.

An example of the steering control is a lane keeping assist control. Hereinafter, the lane keeping assist control will be referred to as "LKA". The LKA is known (for example, JP 2008-195402 A, JP 2009-190464 A, JP 2010-6279 A, and JP 4349210 B).

The LKA is a control of applying an autonomous steering torque to the steering mechanism 42 to change a steering angle of the steered-wheels of the vehicle VA so as to move the vehicle VA along a target moving line which is set by using one or both of the lane markings and a moving path of the preceding vehicle or a preceding vehicle path.

The ECU 10 sets the target moving line, based on the vehicle surrounding information. The target moving line may be a line which connects center positions between the left lane marking and the right lane marking in a road width direction, i.e., a center line of a lane in which the vehicle VA moves or the preceding vehicle path. The ECU 10 calculates the autonomous steering torque for moving the vehicle VA along the target moving line. The ECU 10 causes the steering ECU 40 to control the assist motor 41 to control an actual torque generated by the assist motor 41 to the autonomous steering torque. Thereby, the steering angle of the steered-wheels of the vehicle VA is changed.

The ECU 10 is configured to execute the autonomous driving control in a particular situation. When a predetermined autonomous driving execution condition is satisfied, the ECU 10 executes the autonomous driving control. For example, the predetermined autonomous driving execution condition becomes satisfied when conditions A1 to A3 described below all become satisfied.

Condition A1: The vehicle VA moves on the limited highway.

Condition A2: The vehicle moving speed SPD is equal to or lower than a predetermined speed threshold SPDth.

Condition A3: The driver presses the autonomous driving switch 81 to change the operating condition of the autonomous driving control from an OFF condition to an ON condition.

The predetermined speed threshold SPDth may be set to a relatively small value. In this case, the situation which satisfies the predetermined autonomous driving execution condition, is a condition that the vehicle VA moves in the traffic congestion area. In this situation, the ECU 10 may execute the autonomous driving control.

It should be noted that the autonomous driving execution condition is not limited to an example described above. The autonomous driving execution condition may be any other condition. The road information stored in the map storing section 62 may include information on an area in which the autonomous driving control of the level 3 is allowed to be executed. Hereinafter, this area will be referred to as "autonomous driving area". In this case, the ECU 10 acquires the road information from the navigation ECU 60. Further, when the driver presses the autonomous driving switch 81 in a situation that the vehicle VA moves in the autonomous driving area, the ECU 10 may be configured to determine that the predetermined autonomous driving execution condition becomes satisfied.

In another example, the ECU 10 may be configured to acquire the traffic information including the information on the traffic congestion area via the communication unit 80. In addition, the ECU 10 configured as such may be configured to determine that the predetermined autonomous driving execution condition becomes satisfied when the driver presses the autonomous driving switch 81 while the vehicle VA moves in the traffic congestion area.

When a predetermined autonomous driving termination condition becomes satisfied, the ECU 10 terminates executing the autonomous driving control. For example, the predetermined autonomous driving termination condition becomes satisfied when at least one of conditions B1 to B4 described below becomes satisfied.

Condition B1: The vehicle VA arrives at an exit of the limited highway.

Condition B2: The vehicle moving speed SPD becomes greater than the predetermined speed threshold SPDth.

Condition B3: The driver presses the autonomous driving switch 81 to change the operating condition of the autonomous driving control from the ON condition to the OFF condition.

Condition B4: An event in which an execution of the autonomous driving control cannot be continued, for example, a system error occurs.

It should be noted that the predetermined autonomous driving termination condition is not limited to an example described above. The predetermined autonomous driving termination condition may be any other condition.

<Summary of Consciousness State Determination Process>

The ECU 10 is configured to execute a process of determining whether the driver is conscious. Hereinafter, this process will be referred to as "consciousness state determination process". Below, the consciousness state determination process, based on the first image will be described.

The ECU 10 acquires the first image from the driver monitor camera 76. The ECU 10 determines whether the driver is conscious, based on the first image. In this embodiment, a fact that the driver is conscious means that a consciousness level of the driver is equal to or greater than a predetermined level. On the other hand, a fact that the driver is unconscious means that the consciousness level of the driver is smaller than the predetermined level, i.e., the driver has a feeling of drowsiness or the driver is asleep.

The ECU 10 calculates the consciousness level of the driver, based on the first image in accordance with known techniques. For example, the consciousness level of the driver is calculated, based on at least one of an eye-closed rate, a frequency of eyewink, a state of eye opening (or a distance between a top lid and a bottom lid), an eye movement, and a yawning behavior. Below, the eye-closed rate will be briefly described.

The ECU 10 inputs the first image to an identification device which detects eyes or performs a template matching process to the first image to extract an image of the eyes of the driver from the first image. For example, the ECU 10 determines whether the eyes are closed, based on an aspect ratio of the extracted image of the eye. The ECU 10 calculates the eye-closed rate. The eye-closed rate is a proportion of an eye-closed time with respect to a predetermined time. The eye-closed time is a time when the eye continues being closed. When the eye-closed rate is smaller than a predetermined threshold, the ECU 10 determines that the consciousness level of the driver is equal to or greater than the predetermined level, i.e., the driver is conscious. On the other hand, when the eye-closed rate is greater than the predetermined threshold, the ECU 10 determines that the consciousness level of the driver is smaller than the predetermined level, i.e., the driver is unconscious.

When the ECU 10 determines that the driver is unconscious, the ECU 10 causes the informing device 51 to execute a predetermined alert process. In particular, the ECU 10 causes the meter ECU 50 to activate the buzzer and display the warning lamp on the displaying device.

<Configuration of Mobile Terminal>

Figure 2:
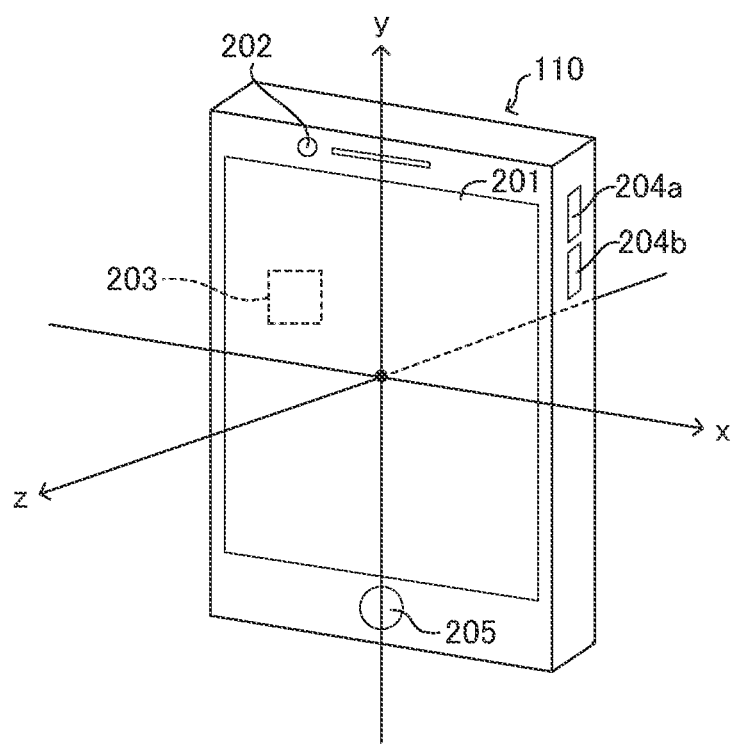
FIG. 2 is an outline view which shows a mobile terminal according to the first embodiment.

The mobile terminal 110 is a device carried by the driver. In this embodiment, the mobile terminal 110 is a smartphone shown in FIG. 2. The mobile terminal 110 may be another device such as a tablet terminal or wearable terminal which the driver can carry.

The mobile terminal 110 includes a display 201. The display 201 is a touch panel type display. The display 201 is configured to detect a touch interaction to a displaying surface or an operation surface of the display 201.

The mobile terminal 110 includes a front camera 202 or a second image-taking section on a surface of the mobile terminal 110 at the side of the display 201. It should be noted that the mobile terminal 110 may include a rear camera on a surface opposite to the display 201, i.e., a back surface.

Further, the mobile terminal 110 includes an acceleration sensor 203 therein. The acceleration sensor 203 acquires information on an acceleration of the mobile terminal 110. Hereinafter, the information on the acceleration of the mobile terminal 110 acquired by the acceleration sensor 203 will be referred to as "second acceleration information". The second acceleration information includes information on an acceleration in an x-axis direction, an acceleration in a y-axis direction, and an acceleration in a z-axis direction shown in FIG. 2. An x-axis is a coordinate axis which extends in a lateral direction of the mobile terminal 110. A y-axis is a coordinate axis which extends in a longitudinal direction of the mobile terminal 110. A z-axis is a coordinate axis which extends in a vertical direction with respect to a surface, in particular, the operation surface of the display 201. Hereinafter, the acceleration in the x-axis direction will be referred to as "acceleration value ax2", the acceleration in the y-axis direction will be referred to as "acceleration value ay2", and the acceleration in the z-axis direction will be referred to as "acceleration value az2".

The mobile terminal 110 includes a first sound volume button 204a, a second sound volume button 204b, and a home button 205. When the driver presses the first sound volume button 204a, a sound volume of the mobile terminal 110 is increased. On the other hand, when the driver presses the second sound volume button 204b, the sound volume of the mobile terminal 110 is decreased. The home button 205 is a button used to temporarily turn off various running application and display a home screen on the display 201.

Figure 3:
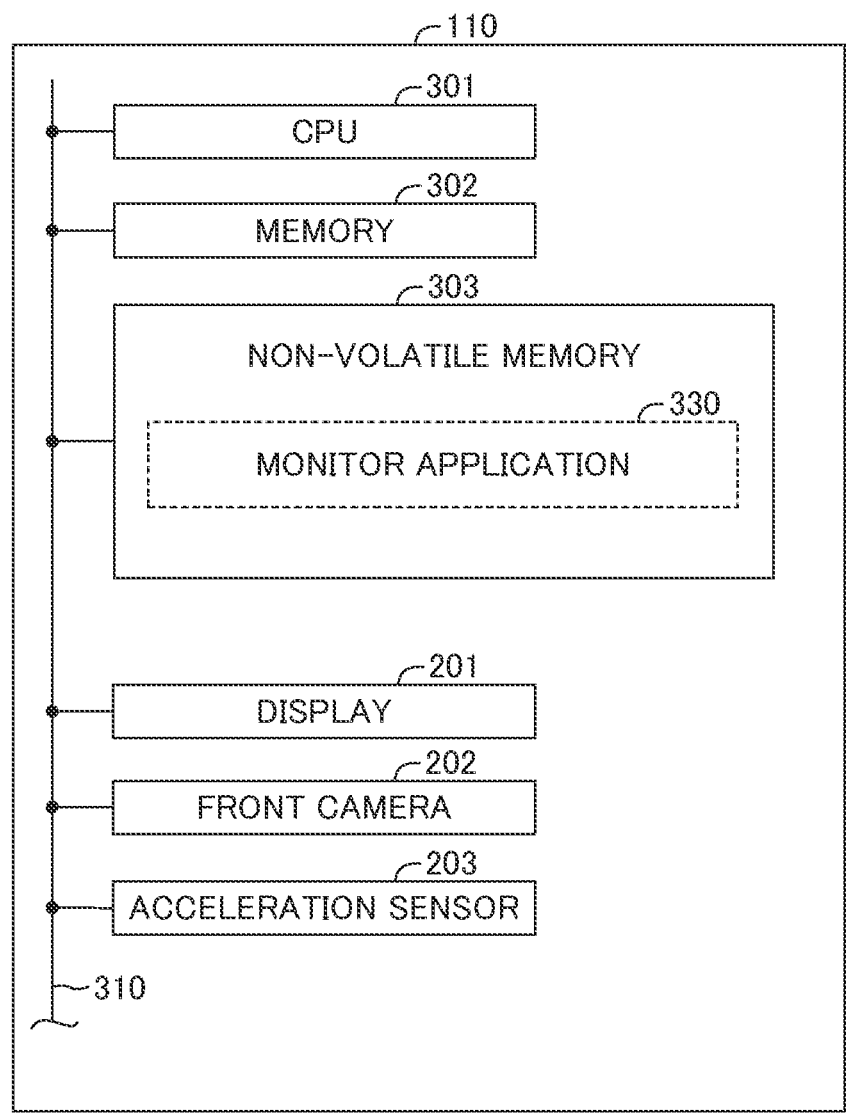
FIG. 3 is a general configuration view which shows the mobile terminal according to the first embodiment.

As shown in FIG. 3, the mobile terminal 110 includes a CPU 301, a memory 302, and a non-volatile memory 303. The CPU 301, the memory 302, the non-volatile memory 303, the display 201, the front camera 202, and the acceleration sensor 203 are electrically connected to each other via an inner bus 310.

The CPU 301 includes at least one processor or circuit. For example, the memory 302 includes a RAM. For example, the non-volatile memory 303 includes a flash memory and a ROM. The CPU 301 executes instructions, routines and programs stored in the non-volatile memory 303 by using the memory 302 as a work memory.

<Summary of Operations of System>

Figure 4:
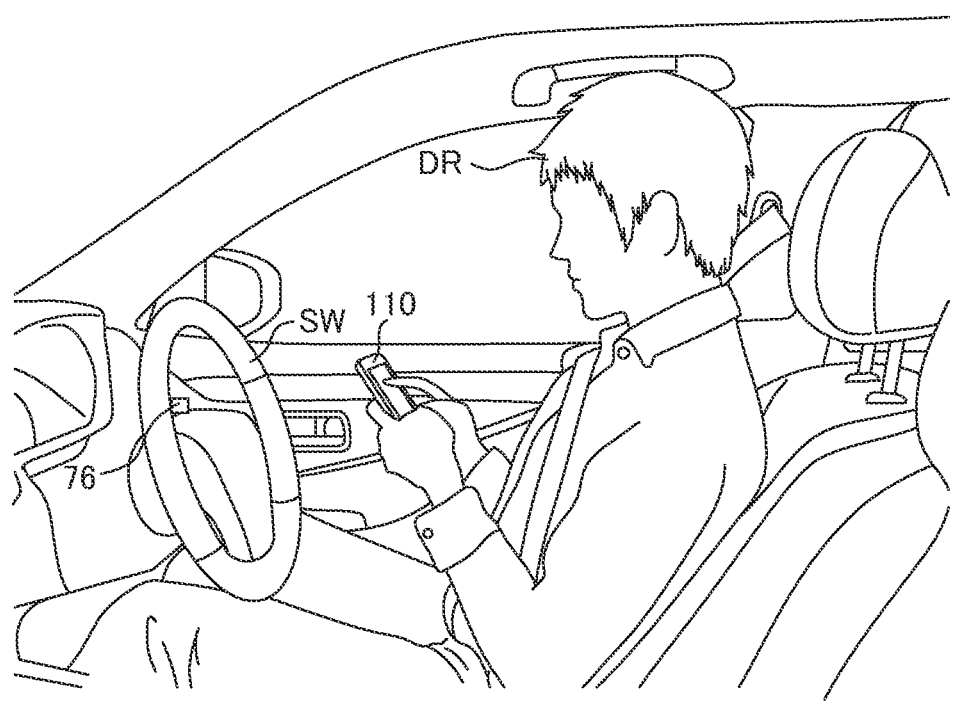
FIG. 4 is a view which shows a situation that a driver of a vehicle operates the mobile terminal while an autonomous driving control is executed.
Figure 5:
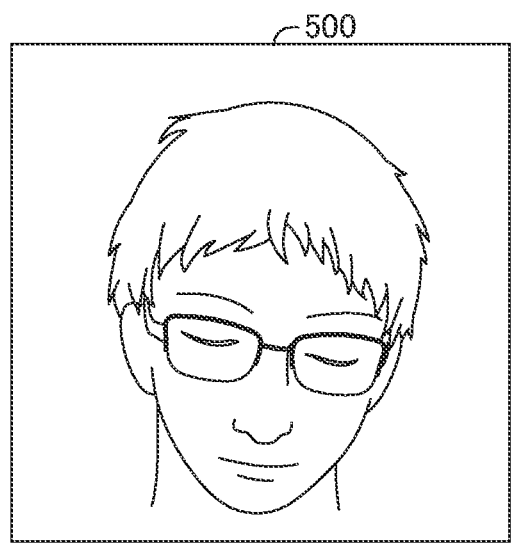
FIG. 5 is a view which shows an example of an image (a first image) taken by a driver monitor camera in the situation shown in FIG. 4.

As shown in FIG. 4, when the driver DR operates the mobile terminal 110 while the ECU 10 executes the autonomous driving control, the driver DR may look down and operate the mobile terminal 110. In this case, the driver monitor camera 76 acquires the first image 500 shown in FIG. 5. The eyes of the driver DR in the first image 500 seems to be closed. In this case, the ECU 10 executes the consciousness state determination process, based on the first image 500 and determines that the driver DR is unconscious, i.e., the driver DR is asleep. Thus, although the driver DR is conscious, the ECU 10 may mistakenly determine that the driver DR is unconscious.

Accordingly, when the ECU 10 presumably determines that a reliability level of a determination result obtained from the consciousness state determination process, based on the first image while the ECU 10 executes the autonomous driving control, the ECU 10 determines whether the driver DR is conscious by using information acquired by the mobile terminal 110. Hereinafter, the information acquired by the mobile terminal 110 will be referred to as "terminal-side information". In addition, a process of determining whether the driver DR is conscious by using the terminal-side information will be referred to as "specified process".

In order to execute the specified process, as shown in FIG. 3, the non-volatile memory 303 of the mobile terminal 110 stores a monitor application 330. The monitor application 330 is a program which monitors a state of the driver DR.

The CPU 301 executes processes described below by executing the monitor application 330. The CPU 301 acquires the image of the driver from the front camera 202. Hereinafter, the image acquired by the front camera 202 will be referred to as "second image". The CPU 301 sends the second image to the autonomous driving apparatus 100 as the terminal-side information. The ECU 10 receives the terminal-side information via the communication unit 80.

In addition, the ECU 10 acquires the first image from the driver monitor camera 76. Then, the ECU 10 determines whether a predetermined condition is satisfied, based on the first image. The predetermined condition is a condition for determining whether the specified process should be executed. Hereinafter, this predetermined condition will be referred to as "specified process condition". The specified process condition is a condition which becomes satisfied when the reliability level of the determination result obtained from the consciousness state determination process, based on the first image is presumably low.

Figure 6:
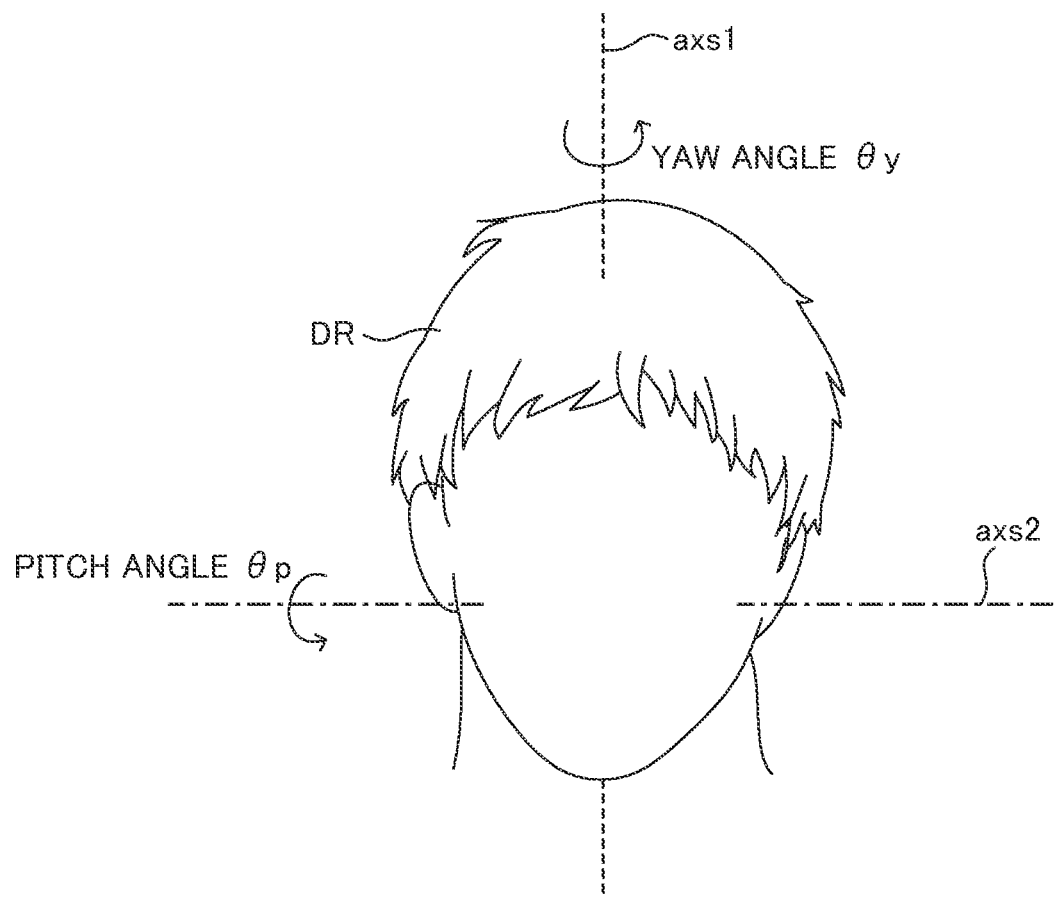
FIG. 6 is a view which describes a face orientation angle corresponding to an angle representing an orientation of a face of the driver.

The ECU 10 executes an image process described below to the first image. The ECU 10 calculates a face orientation angle which is an angle representing an orientation of the face of the driver DR. A method for calculating the face orientation angle is known (for example, see JP 2021-18665 A). As shown in FIG. 6, the face orientation angle includes a yaw angle $\theta y$ and a pitch angle $\theta p$.

The yaw angle $\theta y$ represents a rotation angle of the face of the driver DR about an axis axs1 which extends in an up-and-down direction. The yaw angle $\theta y$ is zero degrees when the driver DR faces forward from the vehicle VA. The yaw angle $\theta y$ takes a positive value when the driver DR faces to the left. On the other hand, when the yaw angle $\theta y$ takes a negative value when the driver DR faces to the right.

The pitch angle $\theta p$ represents a rotation angle of the face of the driver DR about an axis axs2 which extends in a right-and-left direction. The pitch angle $\theta p$ is zero degrees when the driver DR faces horizontally. The pitch angle $\theta p$ takes a positive value when the driver DR faces downward. On the other hand, when the driver DR faces upward, the pitch angle $\theta p$ takes a negative value.

When the driver DR does not face forward from the vehicle VA, the reliability level of the determination result obtained from the consciousness state determination process, based on the first image is presumably low. Thus, the specified process condition of this embodiment becomes satisfied when at least one of a condition C1 and a condition C2 described below becomes satisfied.

Condition C1: A magnitude or an absolute value of the yaw angle $\theta y$ is greater than a predetermined first angle threshold $\theta th1$.

Condition C2: A magnitude or an absolute value of the yaw angle $\theta p$ is greater than a predetermined second angle threshold $\theta th2$.

When the specified process condition is not satisfied, the ECU 10 executes the consciousness state determination process, based on the first image as described above.

On the other hand, when the specified process condition is satisfied, the ECU 10 determines whether the driver DR is conscious by using the terminal-side information or the second image as described above. In particular, the ECU 10 executes the consciousness state determination process, based on the second image. That is, the ECU 10 calculates the consciousness level of the driver DR, based on the second image. Then, the ECU 10 determines whether the driver DR is conscious, based on the consciousness level of the driver DR.

Figure 7:
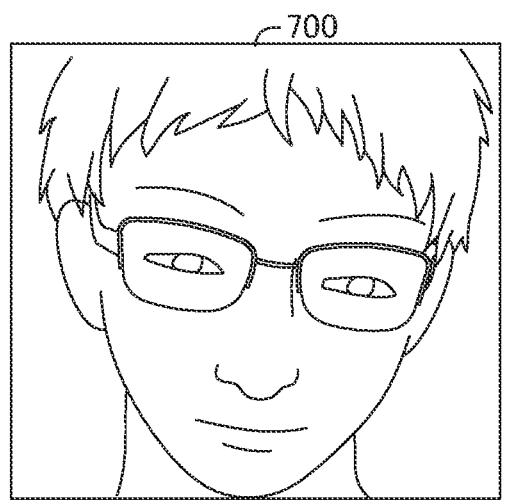
FIG. 7 is a view which shows an example of an image (a second image) taken by a front camera of the mobile terminal in the situation shown in FIG. 4.

When the ECU 10 acquires the first image 500 in a situation shown in FIG. 4, the driver DR looks down and thus, the condition C2 becomes satisfied. That is, the specified process condition becomes satisfied. The ECU 10 receives the second image 700 shown in FIG. 7 as the terminal-side information from the mobile terminal 110. In the situation shown in FIG. 4, the front camera 202 captures the face of the driver DR from the front. Thus, the eyes of the driver DR in the second image 700 are open. That is, the second image 700 properly shows a state of the eyes of the driver DR. Thus, the ECU 10 executes the consciousness state determination process, based on the second image 700 and properly determines that the driver DR is conscious. Accordingly, the ECU 10 can reduce a possibility that the ECU 10 mistakenly determines that the driver DR is unconscious, i.e., the driver DR is asleep.

Operation Example

Figure 8:
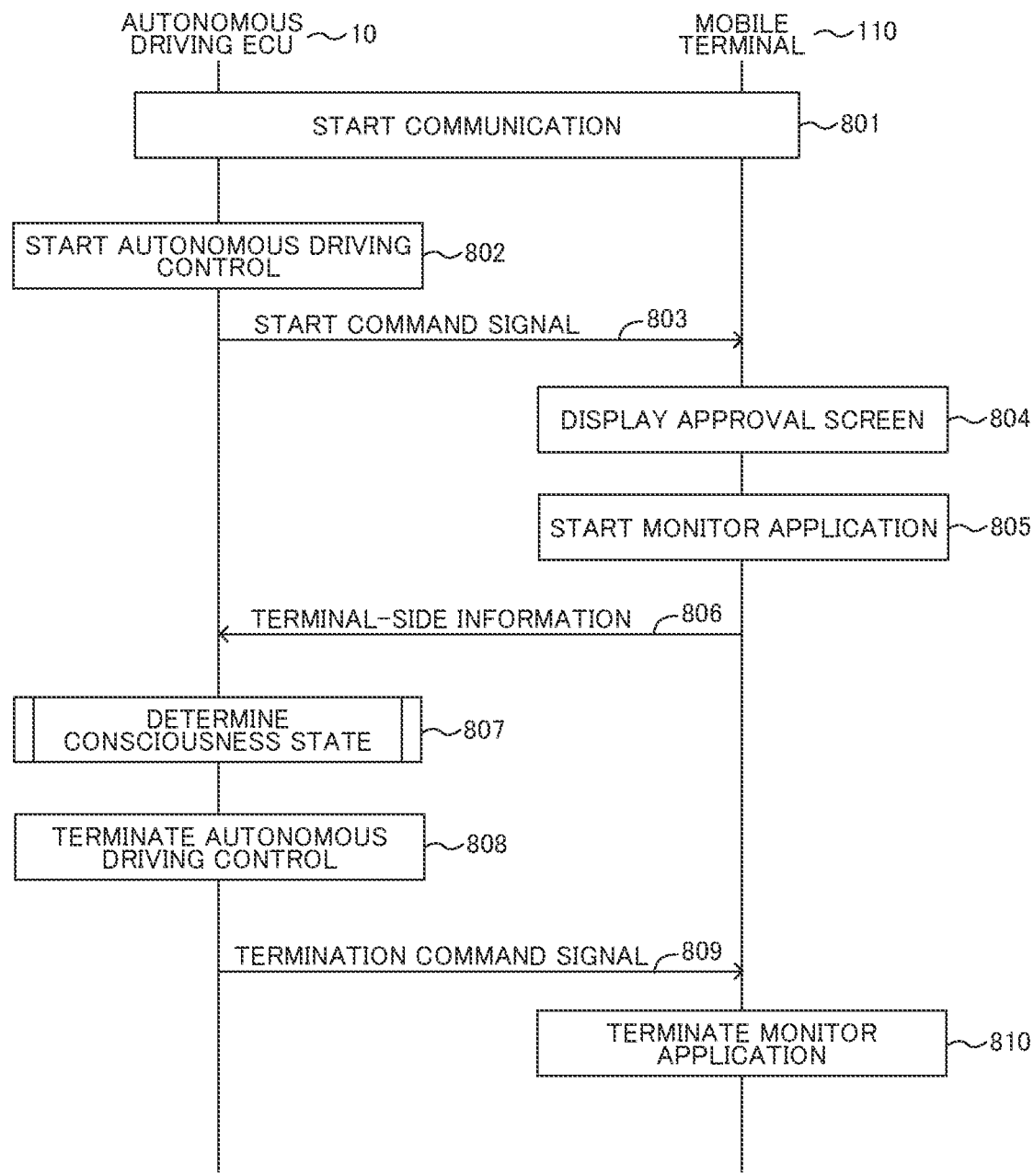
FIG. 8 is a sequence view which relates to an autonomous driving apparatus (an autonomous driving ECU) and the mobile terminal.

With reference to FIG. 8, operations of the autonomous driving apparatus 100 (in particular, the ECU 10) and the mobile terminal 110 will be specifically described.

When the driver DR gets in the vehicle VA, wireless connection between the ECU 10 and the mobile terminal 110 is established. For example, the wireless connection between the ECU 10 and the mobile terminal 110 may be established by paring of Bluetooth (registered trademark). Thereby, the ECU 10 and the mobile terminal 110 start communication via the communication unit 80 (Step 801).

Then, the driver DR drives the vehicle VA. When the vehicle VA moves on the limited highway at the vehicle moving speed SPD equal to or lower than the predetermined speed threshold SPDth, and the driver DR presses the autonomous driving switch 81, the ECU 10 determines that the predetermined autonomous driving execution condition becomes satisfied and starts executing the autonomous driving control (level 3) (Step 802). Then, the ECU 10 sends a start command signal to the mobile terminal 110 (Step 803). The start command signal is a signal which commands the mobile terminal 110 to start the monitor application 330.

The mobile terminal 110 displays an approval screen on the display 201 in response to the start command signal (Step 804). The approval screen is a screen which is used to approve of start of the monitor application 330. When the driver DR presses a predetermined approval button on the approval screen, the mobile terminal 110 starts the monitor application 330 (Step 805).

It should be noted that the mobile terminal 110 may automatically start the monitor application 330 in the background. Thereby, labor of the driver DR to select an application which the driver DR wants to use, can be saved. Thereby, it can reduce a possibility that the driver DR feels bothersome. In another example, the mobile terminal 110 may start the monitor application 330 in the foreground. Thereby, the driver DR can confirm that the monitor application 330 is started. In this example, the mobile terminal 110 may display a list of other applications installed in the mobile terminal 110 on the display 201. The driver DR can select the application which the driver DR wants to use from the list.

The mobile terminal 110 sends the terminal-side information to the ECU 10 each time a predetermined time dT elapses (Step 806). As described above, the terminal-side information includes the second image. The ECU 10 executes a routine shown in FIG. 9 and described later each time the predetermined time dT elapses to determine whether the driver DR is conscious (Step 807). Processes of the step 807 will be described later in detail. Processes of the step 806 and the step 807 described above are repeatedly executed as far as the autonomous driving control is executed.

When the predetermined autonomous driving termination condition becomes satisfied, the ECU 10 terminates executing the autonomous driving control (Step 808). Then, the ECU 10 sends a termination command signal to the mobile terminal 110 (Step 809). The termination command signal is a signal which commands the mobile terminal 110 to terminate the monitor application 330. The mobile terminal 110 terminates the monitor application 330 in response to the termination command signal (Step 810).

Next, with reference to FIG. 9, processes which the ECU 10 (in particular, the CPU 10a) executes at the step 807 shown in FIG. 8, will be described.

Figure 9:
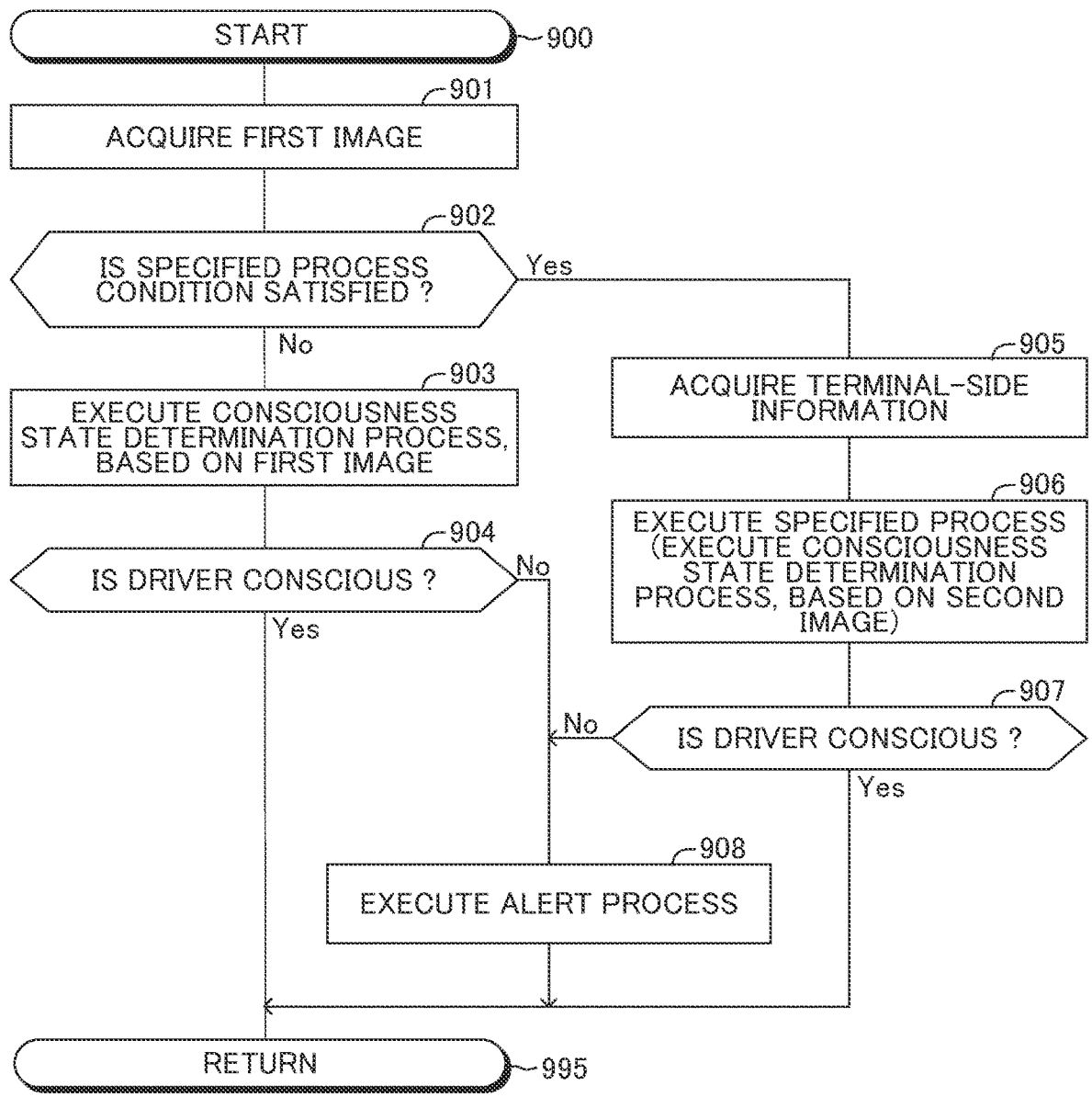
FIG. 9 is a view which shows a flowchart of a routine executed at a step 807 shown in FIG. 8.

The ECU 10 starts a process from a step 900 of the routine shown in FIG. 9 and proceeds the process to a step 901 to acquire the first image from the driver monitor camera 76. Then, at a step 902, the ECU 10 determines whether the specified process condition is satisfied. In particular, the ECU 10 performs the image processing of the first image to calculate the yaw angle θy and the pitch angle θp as described above. Then, the ECU 10 determines whether at least one of the condition C1 and the condition C2 is satisfied.

When the specified process condition is not satisfied, the ECU 10 determines "No" at the step 902 and proceeds the process to a step 903 to execute the consciousness state determination process, based on the first image. Then, at a step 904, the ECU 10 determines whether the driver DR is conscious. When the driver DR is conscious, the ECU 10 determines "Yes" at the step 904 and proceeds the process to a step 995.

On the other hand, when the driver DR is unconscious, the ECU 10 determines "No" at the step 904 and proceeds the process to a step 908 to execute an alert process. In particular, the ECU 10 causes the meter ECU 50 to control the informing device 51. In this case, the ECU 10 activates the buzzer and displays the warning lamp on the displaying device. Then, the ECU 10 proceeds the process to the step 995.

When the specified process condition is satisfied at the step 902, the ECU 10 determines "Yes" and executes processes of steps 905 and 906 described below. Then, the ECU 10 proceeds the process to a step 907.

Step 905: The ECU 10 acquires the terminal-side information including the second image.

Step 906: The ECU 10 executes the specified process. In particular, the ECU 10 executes the consciousness state determination process, based on the terminal-side information (the second image).

Then, at the step 907, the ECU 10 determines whether the driver DR is conscious. When the driver DR is conscious, the ECU 10 determines "Yes" at the step 907 and proceeds the process to the step 995.

On the other hand, when the driver DR is unconscious, the ECU 10 determines "No" at the step 907 and proceeds the process to a step 908 to execute the alert process as described above. Then, the ECU 10 proceeds the process to the step 995.

The consciousness state determination system configured as described above provides following advantages. Even when the driver DR looks down and operates the mobile terminal 110 while the autonomous driving control is executed as shown in FIG. 4, the ECU 10 can accurately determine whether the driver DR is conscious by using the terminal-side information, in particular, the second image 700.

The second image 700 acquired in the situation shown in FIG. 4 is an image of the face of the driver DR taken from the generally front. Thus, the ECU 10 can accurately determine whether the driver DR is conscious by executing the consciousness state determination process to the second image 700.

It should be noted that if the wireless connection between the ECU 10 and the mobile terminal 110 becomes disconnected while the routine shown in FIG. 9 is executed, the ECU 10 cannot acquire the terminal-side information from the mobile terminal 110. In this case, the ECU 10 determines whether the driver DR is conscious by executing the consciousness state determination process to the first image.

Further, the ECU 10 may be configured to execute processes described below at the step 908. The ECU 10 may be configured to determine that the ECU 10 cannot continue executing the autonomous driving control and notify the driver DR of a driving maneuvering switch request. Further, the ECU 10 may be configured to gradually decelerate the vehicle VA and stop the vehicle VA at a safety place such as a road shoulder or an emergency parking zone.

The driver DR may take actions other than operating the mobile terminal 110, e.g., an action of reading a book while the autonomous driving control is executed. When the driver DR puts the mobile terminal 110 on a place in a vehicle interior, the front camera 202 cannot capture the face of the driver DR. Accordingly, the monitor application 330 may include a function described below.

The mobile terminal 110 may be configured to notify the driver DR of whether the face of the driver DR is included in the second image. To this end, the CPU 301 acquires the second image from the front camera 202. Then, the CPU 301 determines whether the face of the driver DR is included in the second image. For example, the CPU 301 determines whether the right and left eyes and the mouth of the driver DR can be detected from the second image. When the face of the driver DR is not included in the second image, the CPU 301 outputs, from a speaker provided in the mobile terminal 110, a message of commanding the driver DR to adjust a set position of the mobile terminal 110. It should be noted that the CPU 301 may be configured to display the second image on the display 201. Thereby, the driver DR can adjust the set position of the mobile terminal 110 by checking the second image displayed on the display 201.

With the consciousness state determination system configured as described above, the driver DR is triggered to set the mobile terminal 110 at a suitable position so as to include the face of the driver DR in the second image. Thus, the ECU 10 can accurately determine whether the driver DR is conscious by executing the consciousness state determination process to the second image.

Second Embodiment

Next, the consciousness state determination system according to a second embodiment of the present disclosure will be described. In the second embodiment, the monitor application 330 includes a function of detecting operation information. The operation information is information on operations to the mobile terminal 110 carried out by the driver DR. The mobile terminal 110 sends the operation information to the ECU 10 as the terminal-side information.

In particular, the mobile terminal 110 executes the monitor application 330 and detects a first operation and a second operation described below. In addition, the mobile terminal 110 acquires information on points of time of detecting the operations such as the first operation and the second operation.

The first operation is an operation as a so-called tapping operation of touching the display 201 with a finger and promptly releasing the finger from the display 201.

The second operation is an operation as a so-called swiping operation of moving the finger on the display 201.

In this embodiment, the operation information is information on types of the operations (i.e., information on whether the operation is the first operation or the second operation) associated with the point of time of detecting the operation. The ECU 10 is configured to receive the operation information from the mobile terminal 110 and detect whether the driver DR operates the mobile terminal 110 each time the predetermined time dT elapses.

The ECU 10 executes the specified process by using the operation information in place of the second image at the step 906 of the routine shown in FIG. 9 as described below. When the operation to the mobile terminal 110 carried out by the driver DR has not been detected for a certain time period at the step 804 shown in FIG. 8 although the driver DR operates the approval screen, it means that there is a high possibility that the driver DR is unconscious, i.e., the driver DR is asleep. Accordingly, the ECU 10 determines whether the driver DR is conscious, based on a time period for which the operation to the mobile terminal 110 carried out by the driver DR has not been detected.

In particular, the ECU 10 determines that the driver DR is conscious as far as at least one of the first operation and the second operation is detected within a predetermined time period threshold pth. On the other hand, when the time period for which neither the first operation nor the second operation have been detected, becomes longer than the predetermined time period threshold pth, the ECU 10 determines that the driver DR is unconscious.

In another example, the ECU 10 may be configured to execute the specified process as described below at the step 906 of the routine shown in FIG. 9. For example, when the driver DR is asleep, the finger of the driver DR may unintentionally touch the display 201. In this case, the mobile terminal 110 sends information representing that the first operation is carried out as the operation information to the ECU 10. Thereby, the ECU 10 determines that the driver DR is conscious. As such, the ECU 10 may mistakenly determine that the driver DR is conscious.

Accordingly, the ECU 10 may be configured to change the time period threshold pth, depending on complexity of the operation to the mobile terminal 110. As a complexity level of the detected operation to the mobile terminal 110 increases, a probability that the driver DR is conscious increases. In the above-described example, the complexity level of the second operation is greater than the complexity level of the first operation.

When the ECU 10 detects the first operation, the ECU 10 sets the time period threshold pth to a first value pth1. Thus, when the ECU 10 detects at least one of the first operation and the second operation within the time period threshold pth (=pth1) after the ECU 10 detects the first operation, the ECU 10 determines that the driver DR is conscious. On the other hand, when the time period for which the ECU 10 has not detected any of the first operation and the second operation after the ECU 10 detects the first operation, becomes longer than the time period threshold pth (=pth1), the ECU 10 determines that the driver DR is unconscious.

When the ECU 10 detects the second operation, the ECU 10 sets the time period threshold pth to a second value pth2. The second value pth2 is greater than the first value pth1. Thus, when the ECU 10 detects at least one of the first operation and the second operation within the time period threshold pth (=pth2) after the ECU 10 detects the second operation, the ECU 10 determines that the driver DR is conscious. On the other hand, when the time period for which the ECU 10 has not detected any of the first operation and the second operation becomes longer than the time period threshold pth (=pth2) after the ECU 10 detects the second operation, the ECU 10 determines that the driver DR is unconscious.

As described above, as the complexity level of the operation to the mobile terminal 110 increases, a waiting time period for determining that the driver DR is unconscious, i.e., the predetermined time period threshold pth increases. It is because the probability that the driver DR is conscious increases as the complexity level of the operation to the mobile terminal 110 carried out by the driver increases. In other words, if a simple operation to the mobile terminal 110 such as the first operation is detected, the driver DR may be unconscious, i.e., the driver DR is asleep. As described above, the time period threshold pth set when the first operation is detected, is smaller than the time period threshold pth set when the second operation is detected. Thereby, the ECU 10 can promptly detect that the driver DR is conscious.

The consciousness state determination system configured as described above provides following advantages. Even when the driver DR looks down and operates the mobile terminal 110 while the autonomous driving control is executed as shown in FIG. 4, the ECU 10 can accurately determine whether the driver DR is conscious by using the operation information.

In particular, when the time period for which the operation to the mobile terminal 110 carried out by the driver DR has not been detected, becomes equal to or longer than the time period threshold pth, there is the high probability that the driver DR is unconscious, i.e., the driver DR is asleep. Thus, the ECU 10 can accurately determine whether the driver DR is conscious by using information on whether the driver DR carries out the operation to the mobile terminal 110.

Further, as the complexity level of the operation to the mobile terminal 110 carried out by the driver DR increases, the probability that the driver DR is conscious increases. Thus, as the complexity level of the operation to the mobile terminal 110 increases, the waiting time period for determining that the driver DR is unconscious, i.e., the predetermined time period threshold pth increases. When the ECU 10 detects the first operation, the ECU 10 sets the time period threshold pth to the first value pth1. On the other hand, when the ECU 10 detects the second operation, the ECU 10 sets the time period threshold pth to the second value pth2. In this regard, there is a relationship of pth1<pth2. Thus, the ECU 10 can accurately determine whether the driver DR is conscious.

It should be noted that the second operation is more complex than the first operation and thus, triggering the driver DR to carry out the second operation can prevent the driver DR from being asleep. Accordingly, the monitor application 330 may include a function described below.

In this regard, the mobile terminal 110 may propose a list of applications to the driver DR after the step 805 shown in FIG. 8. The proposed applications are applications which require the second operation. The mobile terminal 110 can prevent the driver DR from being asleep by triggering the driver DR to carry out a complex operation to the mobile terminal 110.

In another example, the mobile terminal 110 may be configured to forbid the driver DR from starting the application in which only the first operation is used. Thereby, the application in which only the relatively simple operation to the mobile terminal 110 is used, is not started. Thus, it is possible to prevent the driver DR from being asleep.

It should be noted that the mobile terminal 110 may be configured to detect a third operation described below in addition to the first and second operations.

The third operation is an operation as a so-called pinching-out or pinching-in operation which changes an interval between two fingers on the display 201.

The third operation is more complex than the second operation. Thus, the ECU 10 may be configured to set the time period threshold pth to a third value pth3 (>pth2) when the ECU 10 detects the third operation.

Furthermore, the mobile terminal 110 may be configured to send information on operations to the mobile terminal 110 other than the first to third operations to the ECU 10 as the terminal-side information or the operation information. In this regard, the mobile terminal 110 may be configured to send information on operations to the first sound volume button 204a, the second sound volume button 204b, and the home button 205 to the ECU 10 as the terminal-side information. In this case, the ECU 10 may be configured to determine whether the driver DR is conscious, based on the operations to the buttons.

Third Embodiment

Next, the consciousness state determination system according to a third embodiment of the present disclosure will be described. In this embodiment, the mobile terminal 110 sends the second acceleration information to the ECU 10 as the terminal-side information.

The ECU 10 executes the specified process by using the second acceleration information in place of the second image at the step 906 of the routine shown in FIG. 9 as described below. When the driver DR is moving the mobile terminal 110, there is the high probability that the driver DR is conscious. Accordingly, the ECU 10 determines whether the driver DR is conscious, based on the first acceleration information and the second acceleration information.

In particular, the ECU 10 converts three acceleration component values on a coordinate system of the mobile terminal 110 (the x-y-z coordinate system shown in FIG. 2) to three acceleration component values on a coordinate system of the vehicle VA. That is, the ECU 10 converts the second acceleration information, i.e., the acceleration value ax2, the acceleration value ay2, and the acceleration value az2 to the acceleration value ax3 in the longitudinal direction of the vehicle VA, the acceleration value ay3 in the lateral direction of the vehicle VA, and the acceleration value az3 in the vertical direction of the vehicle VA, respectively.

The acceleration sensor 203 detects the acceleration generated by a movement of the mobile terminal 110, and the detected acceleration on the earth always includes the gravity acceleration of about 1[G] (=9.80665 [m/s$^2$]. The gravity acceleration is a vertical vector. Thus, the ECU 10 can calculate an inclination of the mobile terminal 110, based on comparing an output from the acceleration sensor 203 and the gravity acceleration with each other. The ECU 10 converts the second acceleration information, i.e., the acceleration value ax2, the acceleration value ay2, and the acceleration value az2 to three acceleration component values, i.e., the acceleration value ax3, the acceleration value ay3, and the acceleration value az3 on the coordinate system of the vehicle VA by using information on the inclination of the mobile terminal 110.

The second acceleration information includes an acceleration component generated by a movement of the vehicle VA such as a swing and a vibration. Thus, when there is a difference between the first acceleration information and the converted second acceleration information, i.e., the acceleration value ax3, the acceleration value ay3, and the acceleration value az3, the driver DR can be determined to intentionally move the mobile terminal 110. Accordingly, the ECU 10 determines that the driver DR is conscious when at least one of conditions D1 to D3 described below is satisfied.

Condition D1: $|ax1-ax3| \geq axth$
Condition D2: $|ay1-ay3| \geq ayth$
Condition D3: $|az1-az3| \geq azth$ The thresholds axth, ayth, and azth are predetermined thresholds which are set for determining whether the driver DR moves the mobile terminal 110.

On the other hand, when any one of the conditions D1 to D3 is not satisfied, the ECU 10 determines that the driver DR is unconscious.

The consciousness state determination system configured as described above provides following advantages. The ECU 10 can distinguish between the movement of the vehicle VA such as a swinging and a vibration and the movement of the mobile terminal 110, based on the first acceleration information and the second acceleration information and thereby determine whether the driver DR moves the mobile terminal 110. Thus, the ECU 10 can accurately determine whether the driver DR is conscious, based on the movement of the mobile terminal 110.

It should be noted that the present disclosure is not limited to the aforementioned embodiments, and various modifications can be employed within the scope of the present disclosure.

Modified Example 1

The specified process condition is not limited to ones of the examples described above. The specified process condition may include at least one of conditions C3 to C6 in place of or in addition to the conditions C1 and C2. The ECU 10 can estimate whether the reliability level of the determination result obtained from the consciousness state determination process, based on the first image is low by using at least one of the conditions C3 to C6.

Condition C3: The ECU 10 cannot detect at least one of the right and left eyes of the driver DR from the first image.

Condition C4: The ECU 10 cannot acquire or cannot accurately acquire various information on the consciousness level of the driver DR such as the eye-closed rate, the frequency of the eyewink, the eye movement, and the yawning behavior.

Condition 5: The driver DR operates the mobile terminal 110. It should be noted that the ECU 10 can determine whether the driver DR operates the mobile terminal 110, based on the operation information.

Condition C6: A direction of line of sight of the driver DR does not correspond to a forward direction of the vehicle VA. It should be noted that the ECU 10 can calculate the direction of line of sight of the driver DR, based on positions and shapes of inner corners, tails, and irises of the driver's eyes.

Modified Example 2

The ECU 10 may be configured to determine whether the driver DR is conscious by using at least one of the second image, the operation information, and the second acceleration information. That is, the ECU 10 may be configured to determine whether the driver DR is conscious, based on a combination of two or more of the determination result, based on the second image, the determination result, based on the operation information, and the determination result, based on the first and second acceleration information. Thereby, the ECU 10 can accurately determine whether the driver DR is conscious.

Modified Example 3

The terminal-side information may include the determination result which represents whether the driver DR is conscious. That is, the monitor application 330 may include a function of determining whether the driver DR is conscious. The mobile terminal 110 executes the consciousness state determination process to the second image. The determination result obtained from such a process will be referred to as "first determination result". The mobile terminal 110 determines whether the driver DR is conscious, based on the operation information. The determination result obtained from such a process will be referred to as "second determination result". The mobile terminal 110 receives the first acceleration information from the autonomous driving apparatus 100 and determine whether at least one of the conditions D1 to D3 is satisfied, based on the first and second acceleration information. The determination result obtained from such a process will be referred to as "third determination result".

The terminal-side information may include at least one of the first determination result, the second determination result, and the third determination result. When the specified process condition is satisfied, the ECU 10 determines whether the driver DR is conscious by using at least one of the first to third determination results included in the terminal-side information. Thereby, the ECU 10 does not need to execute the process of determining whether the driver DR is conscious. Thus, calculation load of the ECU 10 can be reduced.

Modified Example 4

Another ECU may be provided between the autonomous driving ECU 10 and the mobile terminal 110. The other ECU may be configured to execute the process of determining whether the driver DR is conscious.

Modified Example 5

The autonomous driving ECU 10 may be configured to send the first image to the mobile terminal 110. In this case, the mobile terminal 110 may be configured to execute the process of the step 807 shown in FIG. 8. The mobile terminal 110 may be configured to alert the driver DR by using vibration and/or announcement when the mobile terminal 110 determines that the driver DR is unconscious.

What is claimed is:

1. A consciousness state determination system, comprising:
   a first image-taking section which is mounted on a vehicle and takes images of a driver of the vehicle;
   an electronic control unit which executes a consciousness state determination process of determining whether the driver is conscious, based on a first image corresponding to the image of the driver taken by the first image-taking section; and
   a mobile terminal carried by the driver,
   wherein the electronic control unit is configured to determine whether the driver is conscious, based on terminal-side information corresponding to information acquired by the mobile terminal when a predetermined condition that a reliability level of a determination result obtained from the consciousness state determination process is presumably low, becomes satisfied.

2. The consciousness state determination system as set forth in claim 1,
   wherein the mobile terminal includes a second image-taking section which takes images of the driver,
   wherein the terminal-side information includes a second image corresponding to the image of the driver taken by the second image-taking section, and
   wherein the electronic control unit is configured to determine whether the driver is conscious by executing the consciousness state determination process to the second image when the predetermined condition is satisfied.

3. The consciousness state determination system as set forth in claim 2, wherein the mobile terminal is configured to notify the driver of whether a face of the driver is included in the second image.

4. The consciousness state determination system as set forth in claim 1,
   wherein the mobile terminal is configured to detect operation information corresponding to information on operations to the mobile terminal carried by the driver,
   wherein the terminal-side information includes the operation information, and
   wherein the electronic control unit is configured to determine whether the driver is conscious, based on the operation information when the predetermined condition is satisfied.

5. The consciousness state determination system as set forth in claim 4, wherein the electronic control unit is configured to determine whether the driver is conscious, based on a time period of not detecting any operations to the mobile terminal carried out by the driver.

6. The consciousness state determination system as set forth in claim 5,
   wherein the mobile terminal is configured to at least detect information on a first operation and information on a second operation which is more complex than the first operation as the operation information,
   wherein the electronic control unit is configured to:
      determine that the driver is unconscious when the time period of not detecting any operations to the mobile terminal carried out by the driver becomes longer than a first time period threshold after the electronic control unit detects the first operation; and
      determine that the driver is unconscious when the time period of not detecting any operations to the mobile terminal carried out by the driver becomes longer than a second time period threshold after the electronic control unit detects the second operation, and
   wherein the second time period threshold is greater than the first time period threshold.

7. The consciousness state determination system as set forth in claim 1,
   wherein the consciousness state determination system comprises a first acceleration sensor which is mounted on the vehicle and acquires information on an acceleration of the vehicle as a first acceleration information,
   wherein the mobile terminal includes a second acceleration sensor which acquires information on an acceleration of the mobile terminal as a second acceleration information,
   wherein the terminal-side information includes the second acceleration information, and
   wherein the electronic control unit is configured to determine whether the driver is conscious, based on the first acceleration information and the second acceleration information when the predetermined condition becomes satisfied.

8. An autonomous driving apparatus which is mounted on a vehicle and executes an autonomous driving control of autonomously carrying out driving maneuverings of the vehicle,
   the autonomous driving apparatus comprising:
      an image-taking section which takes images of a driver of the vehicle; and
      an electronic control unit which executes a consciousness state determination process of determining whether the driver is conscious, based on a driver image corresponding to the image of the driver taken by the image-taking section while the electronic control unit executes the autonomous driving control,
   wherein the electronic control unit is configured to determine whether the driver is conscious, based on terminal-side information corresponding to information acquired from a mobile terminal when a predetermined condition that a reliability level of a determination result obtained from the consciousness state determination process is presumably low, becomes satisfied.

* * * * *